United States Patent
Kutliroff et al.

(10) Patent No.: US 9,639,943 B1
(45) Date of Patent: *May 2, 2017

(54) SCANNING OF A HANDHELD OBJECT FOR 3-DIMENSIONAL RECONSTRUCTION

(71) Applicant: INTEL CORPORATION, Santa Clara, CA (US)

(72) Inventors: Gershom Kutliroff, Alon Shvut (IL); Maoz Madmony, Beit Kama (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,021

(22) Filed: Dec. 21, 2015

(51) Int. Cl.
- *G06K 9/00* (2006.01)
- *G06T 7/00* (2017.01)
- *G06T 17/00* (2006.01)

(52) U.S. Cl.
CPC .......... *G06T 7/0051* (2013.01); *G06T 7/0081* (2013.01); *G06T 17/00* (2013.01); *G06T 2200/04* (2013.01); *G06T 2200/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,055,061 B2* | 11/2011 | Katano | ................... | G06T 17/00 345/633 |
| 8,230,367 B2* | 7/2012 | Bell | ........................ | G06F 3/011 382/154 |
| 8,379,987 B2* | 2/2013 | Chai | ................... | G06K 9/00375 382/103 |
| 9,020,186 B2* | 4/2015 | Kim | .................... | G06K 9/00201 382/103 |
| 9,117,138 B2* | 8/2015 | Li | ........................ | G06K 9/4604 |
| 9,201,499 B1* | 12/2015 | Chang | ..................... | G06F 3/011 |
| 2002/0041327 A1* | 4/2002 | Hildreth | ................. | G06F 3/011 348/42 |

(Continued)

OTHER PUBLICATIONS

Izadi, S. et al., "KinectFusion: Real-time 3D Reconstruction and Interaction Using a Moving Depth Camera," UIST' 11, Oct. 16-19, 2011, Santa Barbara, CA., 10 pages.

*Primary Examiner* — Anand Bhatnagar

(74) *Attorney, Agent, or Firm* — Finch & Maloney PLLC

(57) ABSTRACT

Techniques are provided for generating a 3-Dimensional (3D) reconstruction of a handheld object. An example method may include receiving 3D image frames of the object from a static depth camera, each frame including a color image and a depth map. Each of the frames is associated with an updated pose of the object during scanning. The method may also include extracting a segment of each frame corresponding to the object and the hand; isolating the hand from each extracted segment; and filtering each frame by removing regions of the frame outside of the extracted segment and removing regions of the frame corresponding to the isolated hand. The method may further include calculating the updated object pose in each filtered frame; and calculating a 3D position for each depth pixel from the depth map of each filtered frame based on the updated object pose associated with that filtered frame.

24 Claims, 10 Drawing Sheets
(4 of 10 Drawing Sheet(s) Filed in Color)

(56) References Cited

U.S. PATENT DOCUMENTS

| | | | | |
|---|---|---|---|---|
| 2008/0204453 A1* | 8/2008 | Katano | ................... | G06T 17/00 345/420 |
| 2010/0166258 A1* | 7/2010 | Chai | .................. | G06K 9/00375 382/103 |
| 2015/0278589 A1* | 10/2015 | Mazurenko | ............ | G01C 11/30 382/103 |
| 2015/0332471 A1* | 11/2015 | Heo | ..................... | G06K 9/4642 382/103 |
| 2016/0078289 A1* | 3/2016 | Michel | ............... | G06K 9/00389 345/156 |

* cited by examiner

Rectified RGB Image Frame
402

Rectified Depth Map Frame
404

Over-segmented Depth Map
800

SCANNING OF A HANDHELD OBJECT FOR 3-DIMENSIONAL RECONSTRUCTION

BACKGROUND

Depth cameras are generally configured to calculate the distance between the camera and objects within the camera's field-of-view. This depth information, or depth map, can be projected into a 3D coordinate system—for example, with the camera at the origin—to generate a 3-dimensional (3D) image of the scene. Generally, depth cameras also capture color data (e.g., a red, green, blue, or RGB image), which is synchronized to the depth maps. A common application of depth cameras is to scan environments and objects and generate 3D reconstructions based on these scans. As the user moves the camera around the scene, the 3D pose (position and orientation) of the camera is calculated for every frame, and the 3D points obtained from the pixels of the depth maps are transformed to a global coordinate system and stored throughout the scanning process. The accumulation of 3D points constitutes a 3D reconstruction of the scene or object of interest, and can be represented as a signed distance function in a volumetric structure, or, equivalently, as a polygonal mesh.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts, and in which:

Figure 1:
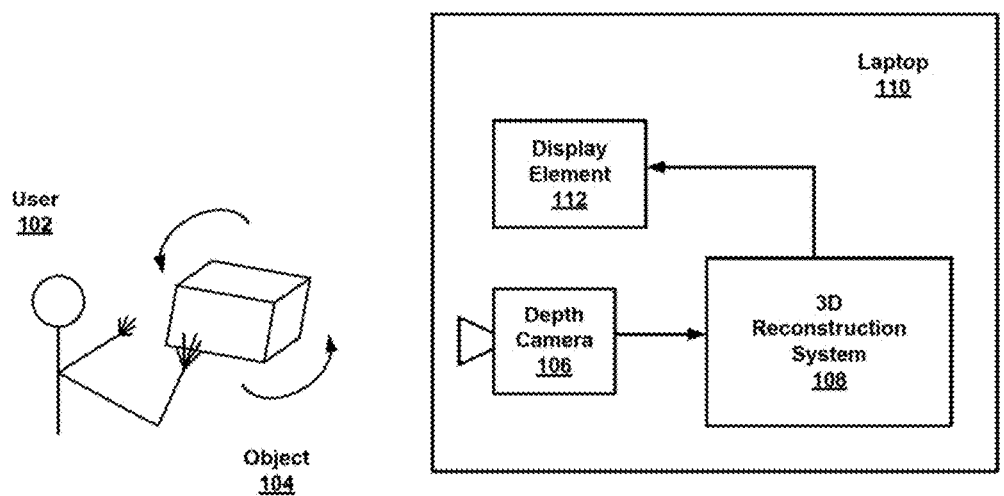
FIG. 1 is a top level block diagram of a system for generating a 3D reconstruction of a handheld object, in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

As previously noted, a user can move a depth camera around a given area to scan the environment or objects therein and generate 3D reconstructions based on those scans. However, when the user wishes to scan an object that is small enough to be held comfortably in hand, such as a vase, or a toy, standard scanning processes tend to have several disadvantages. First, when the camera has a limited operational range, it can be difficult to maintain the camera at the correct distance from the object that is being scanned. In addition, the user's hand (or hands, as the case may be) holding the object should not be included in the scan, and thus must be detected and separated from the object. Furthermore, the camera cannot gain a clear view of all of the faces of the object, particularly any surface of the object that is covered by the user's hand (or hands). Because traditional scanning algorithms often assume that the only moving element in the scene is the camera, it is generally not possible, once the scanning begins, to move the object in order to afford a clear view of its non-visible parts. Lastly, there are configurations in which it is not practical to move the camera around an object, such as when the depth camera is integrated into a laptop or other mobile device, above the display, facing the user. In this case, the laptop cannot be easily rotated around the object in order to provide clear views of the object to the integrated depth camera.

Thus, this disclosure provides techniques for scanning an object and generating a 3D reconstruction of the object, where the object is held by a user. The object can be rotated in front of a stationary depth camera to present various regions or faces of the object to the camera in successive image frames. In some embodiments, the camera may be integrated in a laptop or tablet or smartphone or other mobile device, for example as a user facing depth camera. The camera may also be configured to capture color image frames (e.g., red-green-blue or RGB images) of the scene, substantially concurrent with the depth map frames. In some embodiments, the frames may be captured at a relatively high rate, for example, 30 frames per second or more, to facilitate tracking of the moving object. The techniques provide for detection and removal of the user's hand (or hands, as the case may be), as well as background features, from the camera image frames prior to calculating an updated pose (e.g., position and orientation) of the object in each frame, as will be described in greater detail below. The updated object poses may then be used as a basis to calculate the 3D position of each depth map pixel for the 3D reconstruction.

The techniques described herein, for generating a 3D reconstruction of a handheld object, may provide a number of improvements over conventional scanning, where the camera moves and the object remains stationary. For example, these techniques enable the camera to obtain a clear view of all of the faces or sides of the object, according to some embodiments. Additionally, in still other embodiments, these techniques may allow the user to more easily maintain the object within the camera's operational range, while providing a more practical and ergonomic scanning process (e.g., a laptop may not be easily rotated about a relatively small object). The scanning and reconstruction techniques can be implemented in hardware or software or a combination thereof.

FIG. 1 is a top level block diagram 100 of a system for generating a 3D reconstruction of a handheld object, in accordance with certain of the embodiments disclosed herein. A user 102 is shown to be hand holding and rotating an object 104, for which it is desired to generate a 3D reconstruction. The reconstruction may represent, for example, each of the pixels of the scanned images as 3D points in a global coordinate system. The object 104 is rotated within the field of view of depth camera 106 which, in some embodiments, may be integrated into a laptop or other mobile device 110. The depth camera 106, which is stationary, is configured to provide a series of 3D image frames of the object, each frame comprising a color image frame (e.g., RGB frame) that provides color pixels, and a depth map frame that provides depth pixels. Each of the 3D image frames (RGB-D frames) is associated with an updated pose of the object as it rotates or otherwise moves.

The 3D reconstruction system 108 may be configured to receive the series of 3D image frames and calculate the 3D positions of each depth pixel, calculate the 3D position and orientation of the object relative to the camera, and transform the sampled depth pixels to a single, global coordinate system. The calculated 3D pixel positions may be accumulated into a volumetric representation of the object, in the global coordinate system, as will be described in greater detail below. The system 108 may further be configured to provide feedback to the user 102 through display element 112. The feedback may present the current state of the reconstruction and guide the user's future movements of the object to improve data collection.

Figure 2:
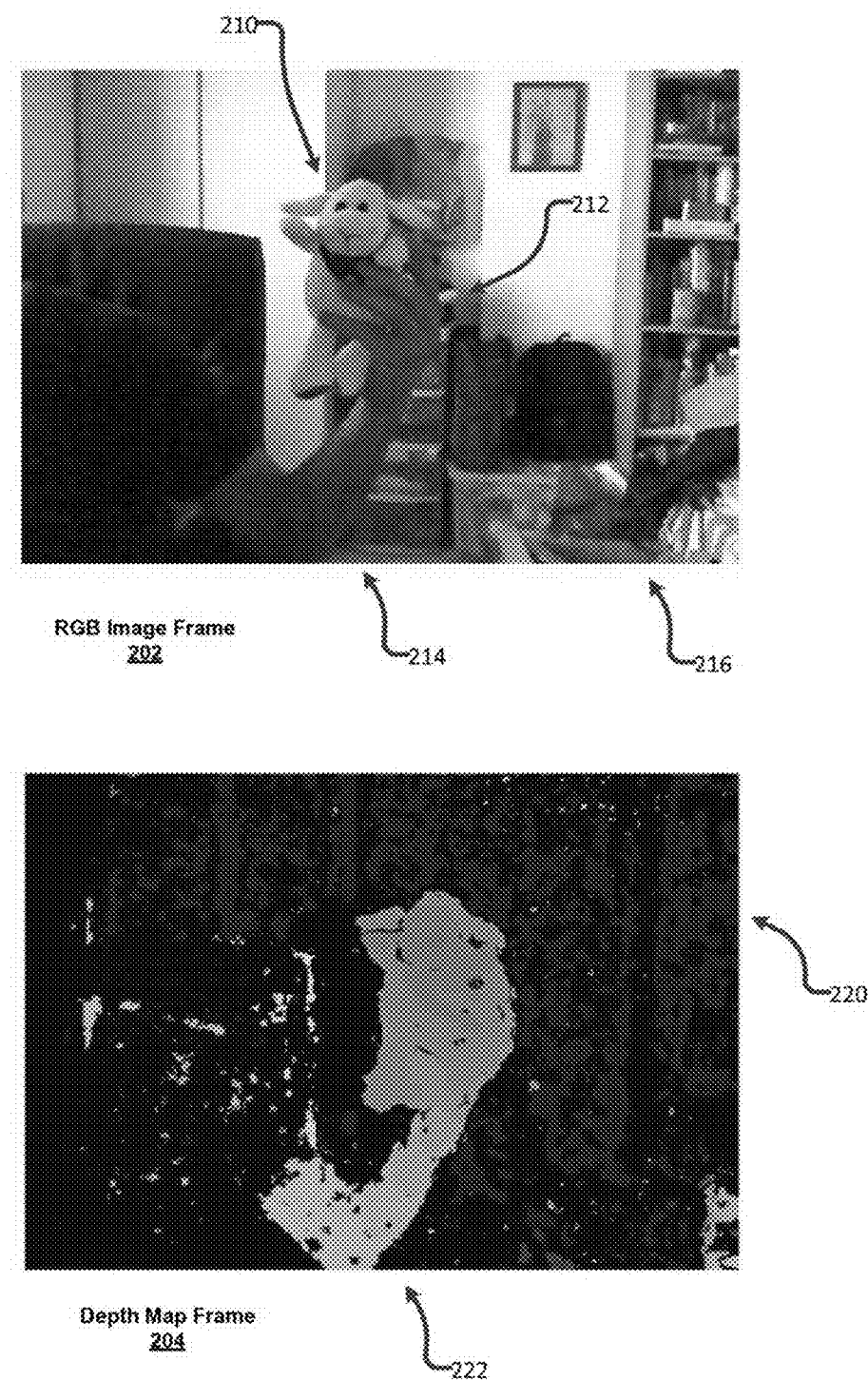
FIG. 2 illustrates an example color image and depth map, in accordance with certain of the embodiments disclosed herein.

FIG. 2 illustrates an example color image and depth map, in accordance with certain of the embodiments disclosed herein. A color or RGB image frame 202 is shown alongside a corresponding depth map frame 204 of the same object and scene. The RGB frame shows an object 210 (stuffed animal) being held in a user's hand 212 which is attached to the user's arm 214 against a background scene 216, all in color. In the depth map frame 204, each pixel represents the distance between that region of the scene and the camera. This can be done through the intensity value of each pixel, which determines the pixel's color representation. In the depth map frame 204, for example, the pixel colors indicate proximity to the camera. In particular, regions with red pixels 220 are relatively far from the camera, while blue pixels 222 are closer. In addition, the operational parameters of the camera are assumed to be known so that each depth pixel can be projected into a 3D global coordinate system, where the camera is considered to be at the origin of this coordinate system. The minimum and maximum depth values for the depth camera correspond to the minimum and maximum distances, respectively, for which the camera's depth values are reliable, and these are also assumed to be known.

Figure 3:
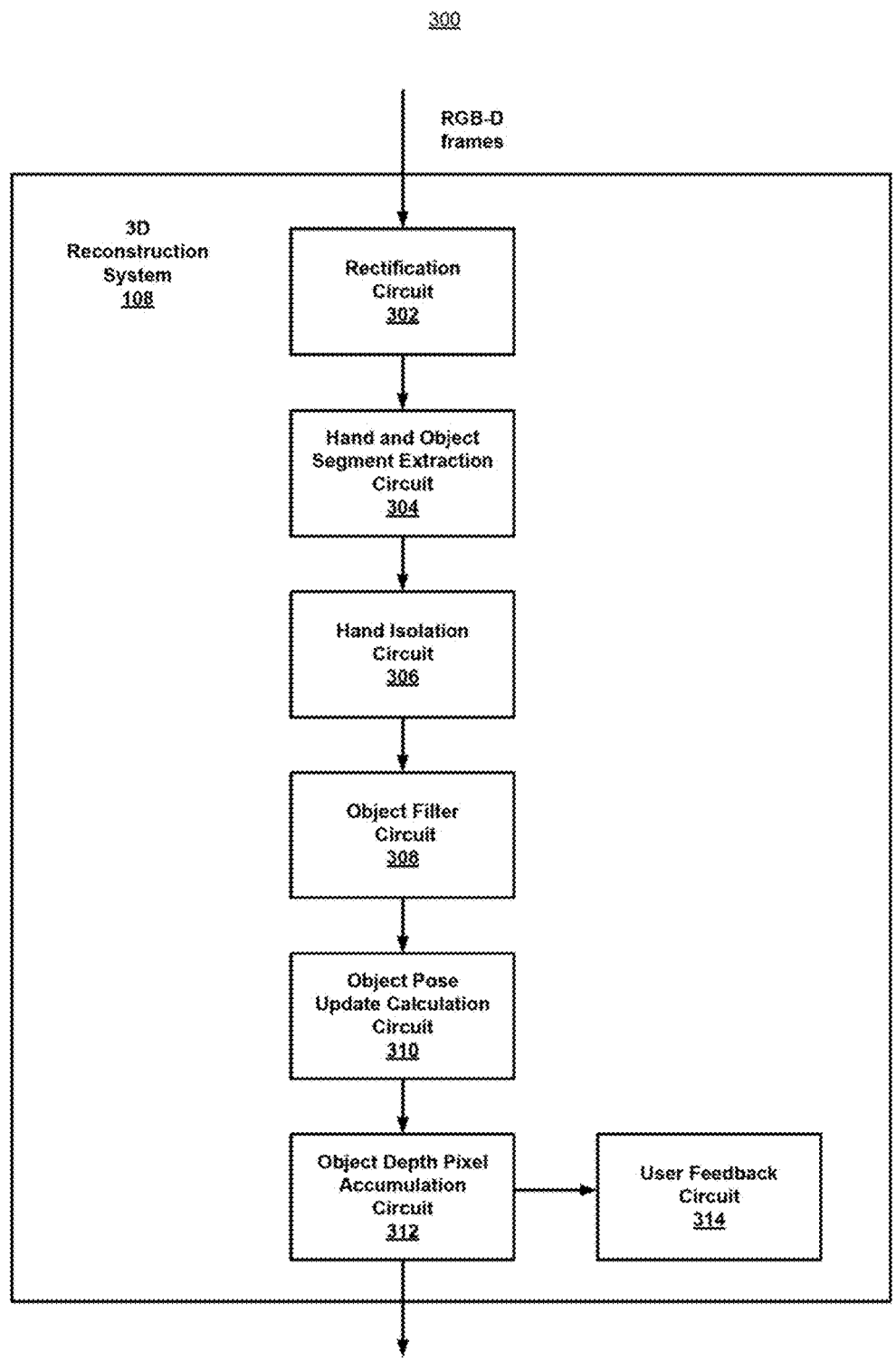
FIG. 3 is a more detailed block diagram of 3D reconstruction system, configured in accordance with certain of the embodiments disclosed herein.

FIG. 3 is a more detailed block diagram 300 of 3D reconstruction system, configured in accordance with certain of the embodiments disclosed herein. The 3D reconstruction system 108 is shown to include a rectification circuit 302, a hand and object segment extraction circuit 304, a hand isolation circuit 306, an object filter circuit 308, an object pose update calculation circuit 310, an object depth pixel accumulation circuit 312 and a user feedback circuit 314.

Figure 4:
FIG. 4 illustrates an example of a rectified color image and depth map, in accordance with certain of the embodiments disclosed herein.
Figure 4:
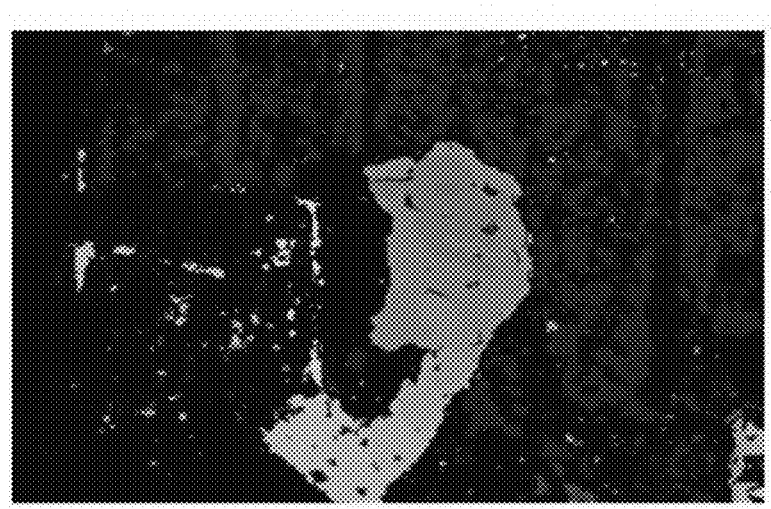

The rectification circuit 302 may be configured to rectify the color image frame and the depth map frame to compensate for any offset between the color sensors and depth sensors of the camera. As shown in FIG. 4, the rectified RGB frame 402 and the rectified depth map frame 404 are aligned. In particular it can be seen that the elements of the rectified RGB image 402 are at the same relative horizontal and vertical locations as the corresponding elements of the rectified depth image 404. This facilitates the joint use of the RGB and depth images, particularly during isolation of the user's hand, as will be explained below.

The hand and object segment extraction circuit 304 may be configured to extract a segment of each 3D image frame corresponding to the object and the hand. In some embodiments, the segment of each 3D image frame corresponding to the object and to the hand may be determined based on the distance to the camera and on a connected components analysis, as will be described in greater detail below in connection with FIG. 5.

The hand isolation circuit 306 may be configured to isolate the hand from each extracted segment. It is generally assumed that the object being scanned is rigid, while the user's hand and fingers are not, and may bend and flex while rotating the object. In some embodiments, the hand isolation may be based on an over-segmentation of the extracted object and hand into sub-regions along with tracking and classification of the sub-regions based on analysis of the color and depth pixels of the sub-regions, as will be explained in greater detail in connection with FIG. 6.

Figure 7:
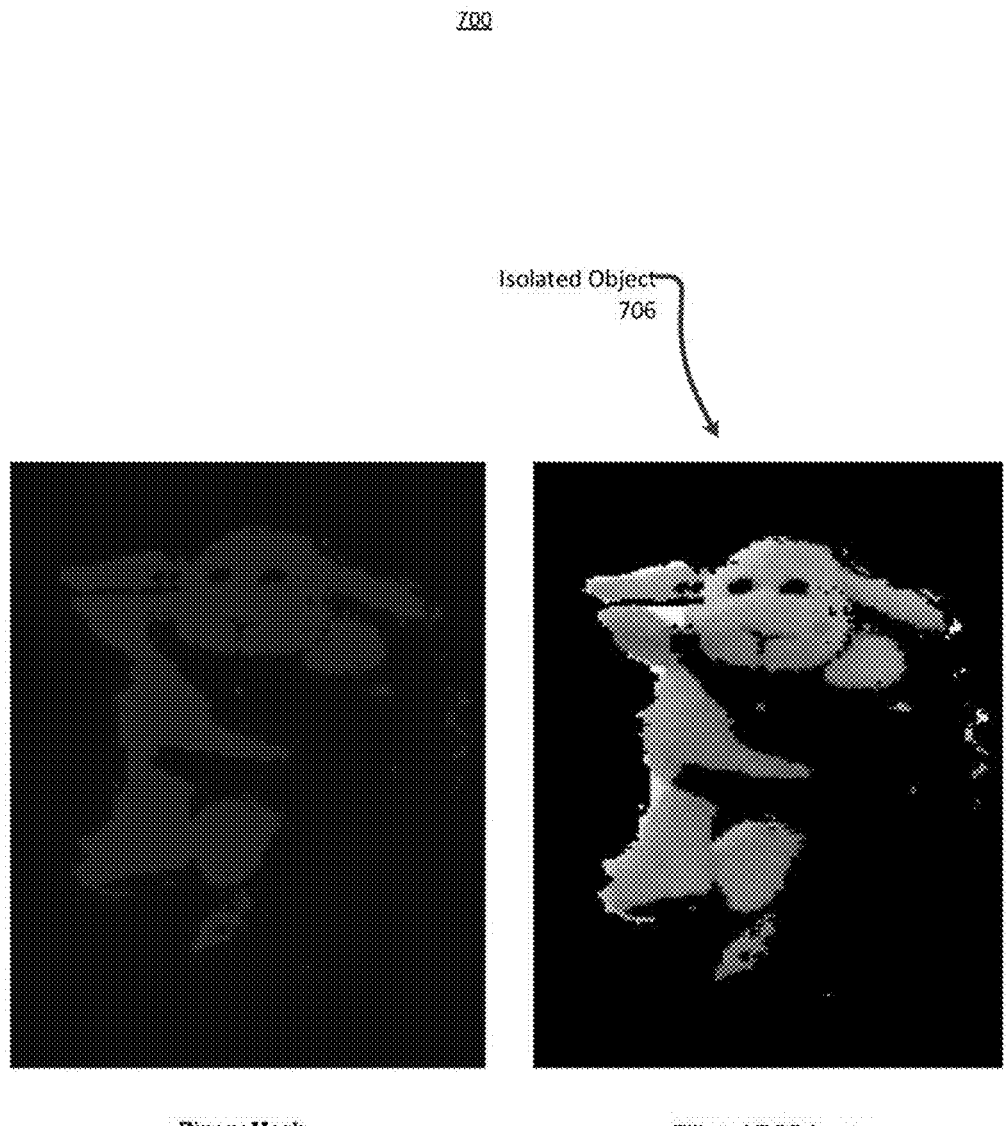
FIG. 7 illustrates object isolation, in accordance with certain of the embodiments disclosed herein.

The object filter circuit 308 may be configured to filter each 3D image frame to leave just the object of interest. This may be accomplished by removing regions of the frame outside of the extracted segment (e.g., the background), as provided by circuit 304, and further removing regions of the frame corresponding to the isolated hand, as provided by circuit 306. In some embodiments, pixels corresponding to the object maintain the depth values from the original depth map, while all other pixels are set to zero. FIG. 7 illustrates this process where pixels corresponding to the hand have been removed from the binary mask 702 and the filtered RGB image 704 leaving just the isolated object 706. When all of the pixels corresponding to the object have been isolated, the 3D reconstruction can be updated for the current frame.

The object pose update calculation circuit 310 may be configured to calculate the updated object pose in each filtered 3D image frame. The calculated pose of the object is the 3D transformation from the position and orientation of the object in a previous frame, to its position and orientation in the current frame. Three parameters may describe the translation of the object between consecutive frames (e.g., x, y and z). Three additional parameters may describe the change in orientation (e.g., yaw, pitch and roll angle) for a total of six degrees of freedom that need to be computed to determine the updated pose of the object relative to given its pose in the previous frame. The object is assumed to be rigid for this calculation so that changes in position and/or orientation are not caused by flex in the object. As the user holds and rotates the object in front of the camera, however, it is assumed that his hand and fingers are moving in a non-rigid manner, necessitating removal of the depth pixels corresponding to the hand and fingers before estimating the object pose update. Of course, in some frames the change in position and/or orientation of the object relative to a previous frame (e.g., the change in pose) may be non-existent or negligible depending on the user's actions. In other words, the user may not keep the object in continuous motion throughout the scanning process. For example, the user may rest for some periods of time, in which case the updated pose may be the same as the previous pose.

In some embodiments, the estimation of the rigid transformation of the object is implemented using known techniques in light of the present disclosure, such as, an Iterative Closest Point (ICP) matching operation performed on the depth pixels. In such a case, the object pose is calculated by registering the depth data of the filtered depth images from successive frames and deriving the rigid transformation to align them. This registration between frames is generally possible because the frame rate is high enough (e.g., 30 frames per second or more) so that the movement or rotation of the object is relatively negligible between frames. Each depth pixel is projected to 3D space, and vertex and normal maps are computed from which ICP is used to match the closest points from the current frame to the reconstructed surface obtained from a truncated signed distance function volumetric representation.

Other known techniques in light of the present disclosure may also be used to estimate the rigid transformation of the object, such as, for example, application of an RGB feature mapping algorithm to track the object based on the RGB pixels of each frame. In this case, feature descriptors are computed at each RGB frame, and then corresponding feature descriptors are matched across successive frames. The transformation is then computed by triangulation. Because the 3D transformation from the camera to the location of each depth pixel is available, once the object pose is computed for a given frame, every pixel can be represented as a 3D point in the global coordinate system, including the 3D position of every depth pixel location for each frame in which the object pose was computed.

The object depth pixel accumulation circuit 312 may be configured to calculate a 3D position for each depth pixel from the depth map frame of each filtered 3D image frame after estimation of the updated object pose. The object depth pixel accumulation circuit 312 is further configured to accumulate the calculated 3D positions of each depth pixel, from the current and previous frames, into volumetric representation of the object in a global coordinate system.

The user feedback circuit 314 may be configured to provide feedback to the user holding the object. The feedback may include a raycast rendering of the current volumetric representation of the object at any given point in time and may serve to guide the user's future handheld motions or pose updates of the object. For example, the feedback may be provided to the user during the scanning process in order to display the current reconstruction of the object, according to the current (and/or previous) views of the camera with respect to the object. As a result, the user is guided to present to the camera regions of the object that are missing data points. For example, if parts of the hand are blocking the camera's view of the object, the user will be guided to move his hand to provide a clearer view allowing a full scan of all regions of the object.

Figure 5:
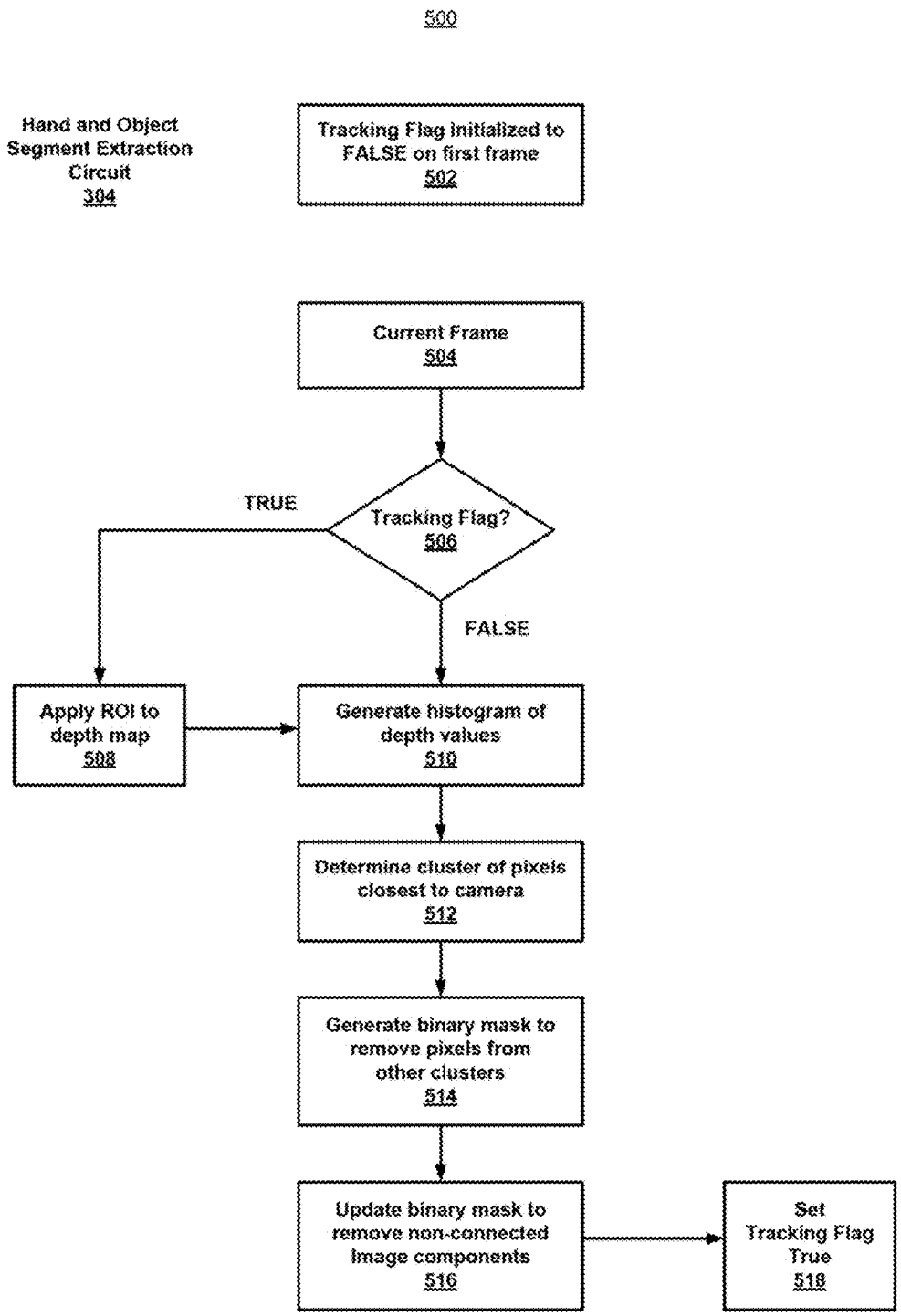
FIG. 5 is a flowchart illustrating a methodology for hand and object segment extraction, in accordance with certain of the embodiments disclosed herein.

FIG. 5 is a flowchart 500 illustrating a methodology for hand and object segment extraction, in accordance with certain of the embodiments disclosed herein. Hand and object segment extraction circuit 304 may be configured to implement this methodology to generate an output set of pixels limited to only the user's hand (and possibly arm) and the object of interest being scanned. At operation 502, a tracking flag is initialized to FALSE, for example on the first frame. At operation 504, a current frame is received and, at operation 506, the tracking flag is checked to determine if there was a hand plus object region being tracked in the previous frame. If not, then at operation 510, the depth image pixels are analyzed and the depth values are sorted into a histogram. At operation 512, the cluster of pixels corresponding to the region closest to the camera is determined since these will be most likely to include the hand, arm and object, as opposed to background scenery which will likely be at a greater distance from the camera. The number of bins in the histogram can be set on an ad hoc basis. At operation 514, all depth pixels included in the closest histogram cluster are set to 1, and all other depth pixels are set to 0, yielding a binary mask. Because the depth map is typically subject to some degree of noise, this step may result in filtering out some of the depth pixels from the hand plus object region. This may be advantageous, however, since those noisy pixels will not be included in the computations performed in subsequent operations. Next, at operation 516, a connected-components algorithm is applied on the binary mask and any pixels equal to 1 but not connected to the closest cluster are set to 0. The connected-components algorithm may be implemented using known techniques in light of the present disclosure. Finally, the binary mask is stored, to be used as a basis for generating the binary mask of the next frame, and, at operation 518 the tracking flag is set to TRUE.

Returning to operation 506, if the tracking flag is TRUE, indicating that there was a hand plus object region being tracked in the previous frame, a region-of-interest is applied to the depth map, at operation 508, in order to restrict the search for depth pixels corresponding to the hand plus object. Because the depth map and RGB images are captured at a relatively high frame-rate, differences between successive frames are small enough so that the group of pixels corresponding to the hand plus object in one frame should be close to its location in the previous frame. In particular, a 2D bounding box is created from the binary mask generated at the previous frame. The bounding box is extended by a small number of pixels horizontally and vertically to account for possible movements of the hand plus object, and all depth pixels outside of the extended bounding box are set to 0 in the new binary mask. Next, control passes to operation 510, and the process continues as described above.

In some embodiments, alternate methods for segmenting the foreground hand plus object pixels from the background pixels may be employed, including, for example, the use of Gaussian Mixture Models (GMM's), as known in light of the present disclosure. In particular, the GMM technique may assume that pixels associated with different regions of the image have a Gaussian distribution and the regions may then be segmented based on a desired number of standard distributions, as opposed to a simple threshold.

Figure 6:
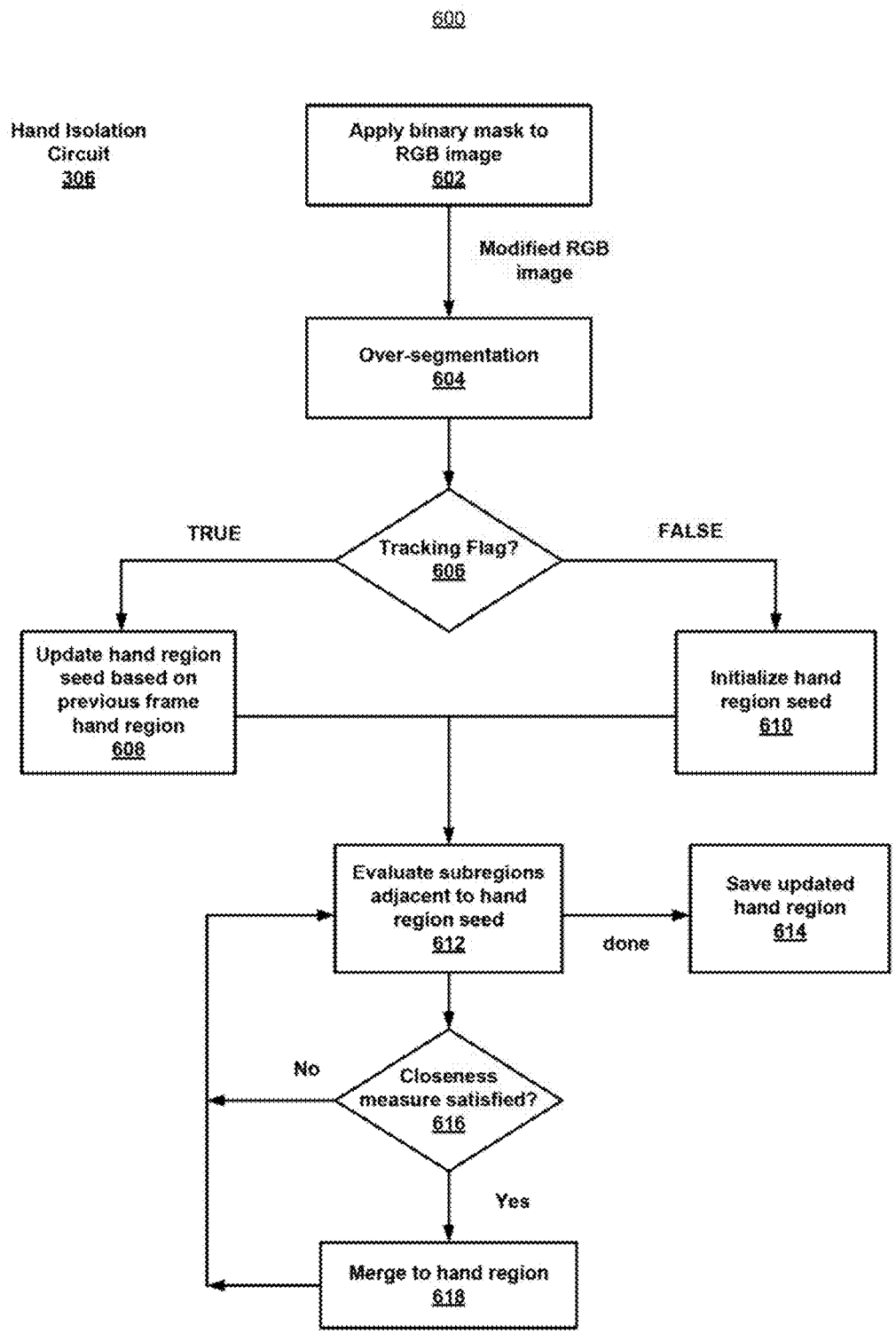
FIG. 6 is a flowchart illustrating a methodology for hand isolation, in accordance with certain of the embodiments disclosed herein.
Figure 8:
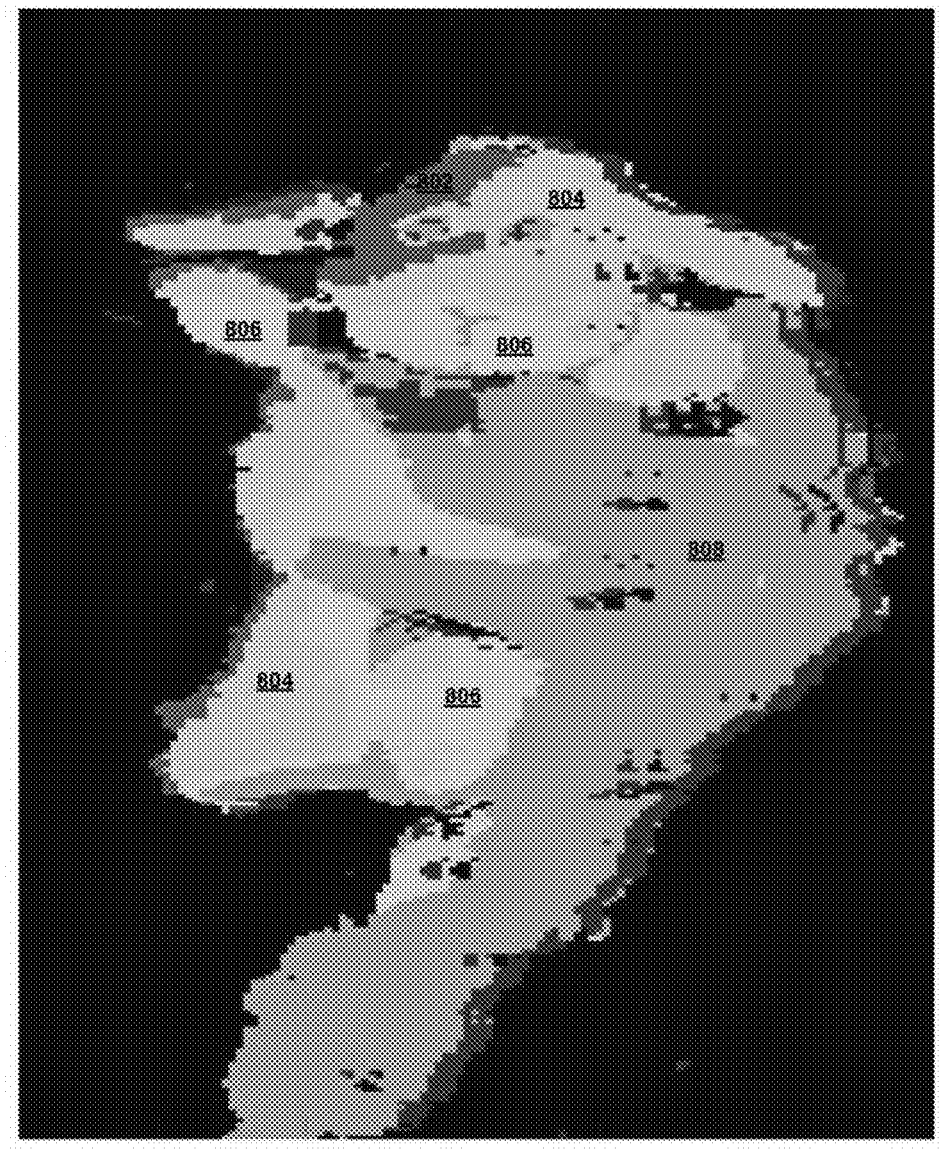
FIG. 8 illustrates an example of depth map over-segmentation, in accordance with certain of the embodiments disclosed herein.

FIG. 6 is a flowchart 600 illustrating a methodology for hand isolation, in accordance with certain of the embodiments disclosed herein. Hand isolation circuit 306 may be configured to implement this methodology, for example by accepting, as input, the group of pixels corresponding to both the hand and the object, from circuit 304, and separating those pixels corresponding to the hand from pixels corresponding to the object. At operation 602, the binary mask (generated by circuit 304) is applied to the RGB image frame to clear all RGB pixels that do not correspond to values for which the binary mask is set. This generates a modified RGB image in which non-zero pixel values correspond to the hand and object. Next, at operation 604, the modified RGB image is over-segmented into multiple sub-regions. In some embodiments, this is accomplished through k-means clustering on the modified RGB image, where k can be chosen on an ad hoc basis. The k-means clustering algorithm may be implemented using known techniques in light of the present disclosure. FIG. 8 provides an illustration of a depth map corresponding to an over-segmented frame for which k was set to 6, to generate 6 segment classes into which any number of sub-regions may be classified. For example, four of the larger sub-regions are labeled 802, 804, 806 and 808. In some embodiments, over-segmentation techniques may be implemented using other known techniques in light of the present disclosure, such as, for example, superpixels.

Next, the sub-regions that correspond to the hand are merged into a single region. At operation 606, the tracking flag is checked to determine if the hand was tracked in the previous frame. If so, then at operation 608, a combination of sub-regions corresponding to the largest overlap with the previous frame hand region is selected as a seed region for hand isolation in the current frame. If not, then at operation 610 a hand region seed is initialized based on other criteria. For example, in some embodiments, the hand region seed may be initialized by selecting the sub-regions that border the image, since generally the user's arm is the only sub-region not entirely contained within the frame of the image. See, for example, arm 214 in FIG. 2.

Next, at operation 612, all sub-regions adjacent to the hand region seed are evaluated to select which should be merged to form the new hand region. In some embodiments, this evaluation is performed, at operation 616, by calculating the average depth and RGB values of the seed region and selecting the adjacent sub-regions that have depth and RGB values that satisfy some measure of closeness to the average seed region values. Of course, other color spaces beside RGB, such as Luminance/Chroma (YUV) or Hue/Saturation/Value (HSV), may also be used. For example, if there is an adjacent sub-region with sampled RGB and depth values that are within a pre-defined threshold distance from those of the seed region, the pixels of the sub-region are appended or merged to the hand region, at operation 618, and the hand region's RGB and depth values are updated based on the new larger region. If there are no adjacent sub-regions within the threshold distance, the process is complete and the current hand region is saved, at operation 614, so that it can be used to initialize the hand seed region in the next frame.

Methodology

Figure 9:
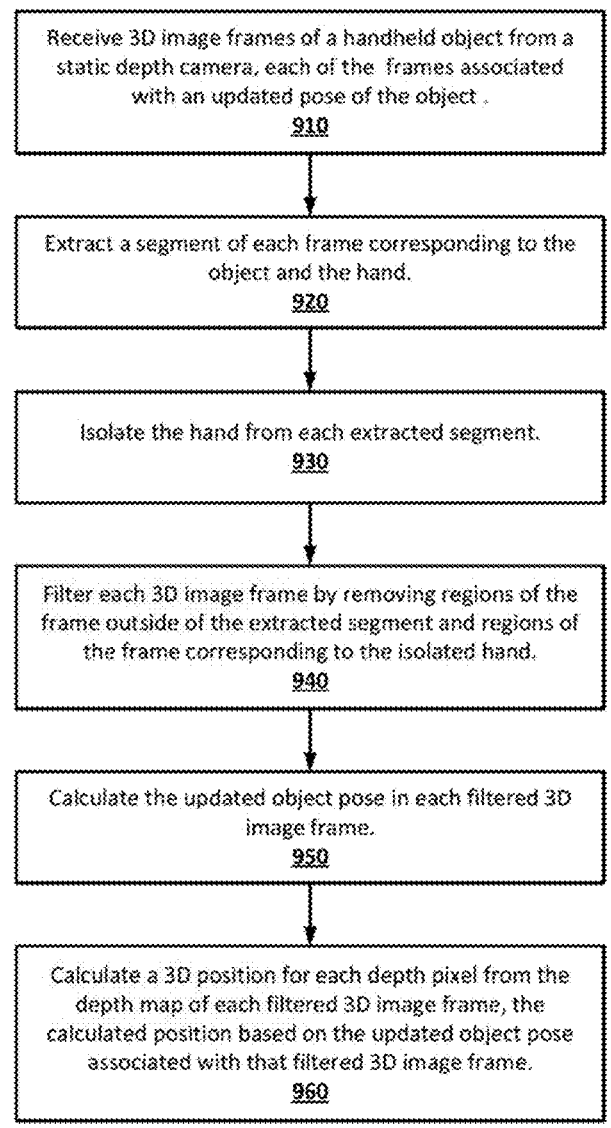
FIG. 9 is a flowchart illustrating a methodology for generating a 3D reconstruction of a handheld object, in accordance with certain of the embodiments disclosed herein.

FIG. 9 is a flowchart illustrating an example method 900 for generating a 3D reconstruction of a handheld object, in accordance with an embodiment of the present disclosure. As can be seen, example method 900 includes a number of phases and sub-processes, the sequence of which may vary from one embodiment to another. However, when considered in the aggregate, these phases and sub-processes form a process for generating a 3D reconstruction of a handheld object in accordance with certain of the embodiments disclosed herein. These embodiments can be implemented, for example using the system architecture illustrated in FIG. 3, as described above. However other system architectures can be used in other embodiments, as will be apparent in light of this disclosure. To this end, the correlation of the various functions shown in FIG. 9 to the specific components illustrated in FIG. 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for generating a 3D reconstruction of a handheld object commences by receiving, at operation 910, a series of 3D image frames of the object as it is moved or rotated in the hands of a user, such that each frame may provide a new view of an updated pose of the object. The 3D image frames may be provided by a static (stationary) depth camera. Each frame includes a color image frame comprising color pixels and a depth map frame comprising depth pixels. Next, at operation 920, a segment is extracted from each 3D image frame corresponding to or encompassing just the object and the user's hand. At operation 930, the hand is isolated from each extracted segment.

At operation 940, each 3D image frame is filtered to remove regions of the frame that are outside of the extracted segment and also to remove regions that correspond to the isolated hand, leaving just the object.

At operation 950, the updated pose of the object is calculated in each filtered 3D image frame. In some embodiments, the calculation may estimate a rigid transformation of the object based on an Iterative Closest Point (ICP) matching operation performed on the depth pixels or based on an RGB feature matching operation performed on the color pixels.

At operation 960, a 3D position is calculated for each depth pixel from the depth map of each filtered 3D image frame. The calculated position is based on the updated object pose associated with that filtered image frame.

Of course, in some embodiments, additional operations may be performed, as previously described in connection with the system. These additional operations may include, for example, rectifying the color image frame and the depth map frame to compensate for any offset between the color and depth sensors of the camera. Further additional operations may include, for example, accumulating the calculated 3D positions of each depth pixel into a global coordinate system based volumetric representation of the object. Additionally, in some embodiments, feedback may be provided to the user to guide the future movement of the object, for example to ensure that satisfactory views of all faces of the object are obtained. The feedback may include a raycast rendering of the volumetric representation of the object at any given point in time.

Example System

Figure 10:
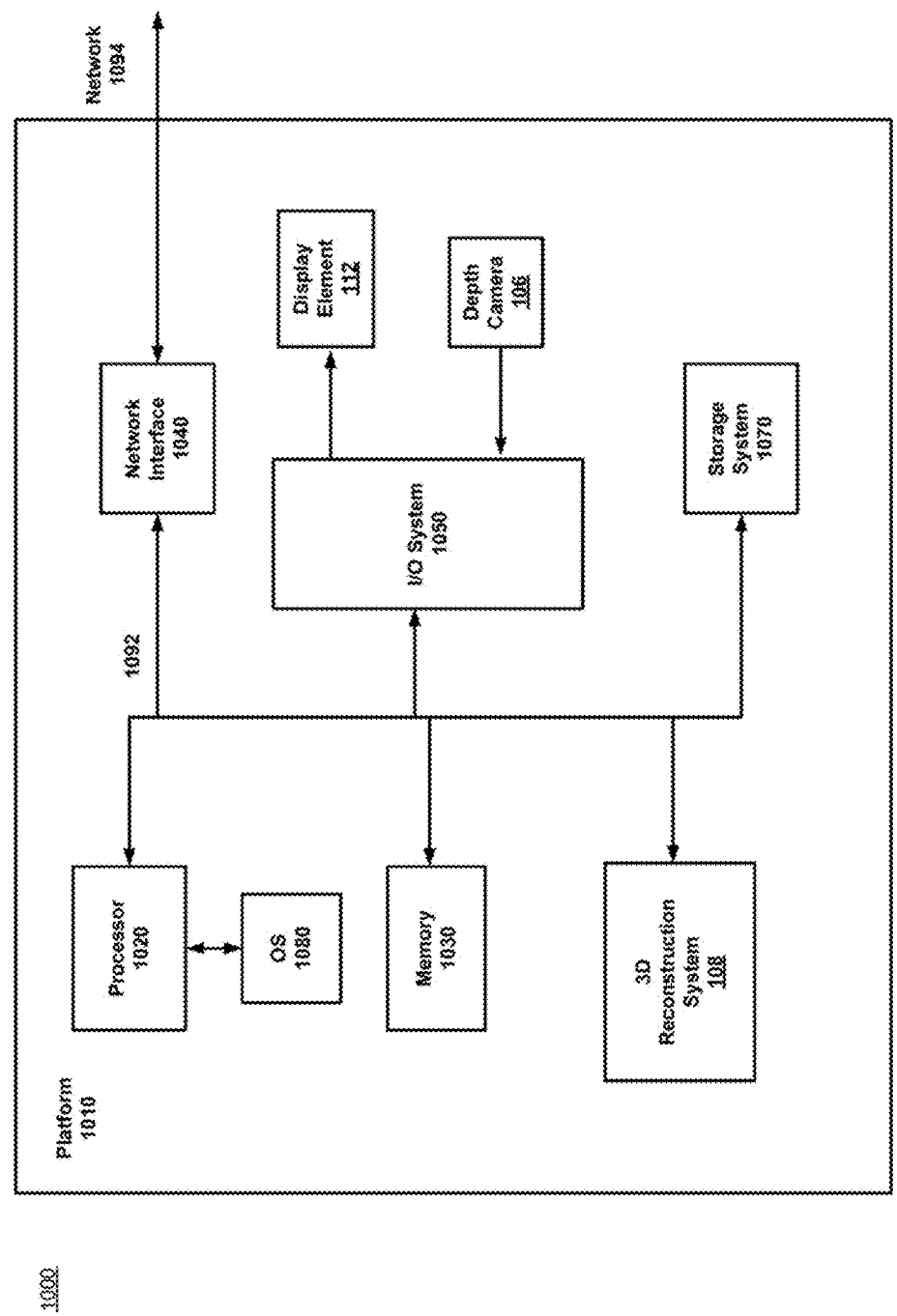
FIG. 10 is a block diagram schematically illustrating a system platform to generate a 3D reconstruction of a handheld object, configured in accordance with certain of the embodiments disclosed herein.

FIG. 10 illustrates an example system 1000 that may be configured to generate a 3D reconstruction of a handheld object, as described herein. In some embodiments, system 1000 comprises a platform 1010 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 1010 may comprise any combination of a processor 1020, a memory 1030, a 3D reconstruction system 108, a depth camera 106, a network interface 1040, an input/output (I/O) system 1050, a display element 112, and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 1000, and therefore may also be implemented using any suitable existing or subsequently-developed platform.

Network interface module 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a display element 112, depth camera 106, and other devices not shown such as a keyboard, mouse, speaker, microphone, etc.

I/O system 1050 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1020 or any chipset of platform 1010. In some embodiments, display element 112 may comprise any television type monitor or display, including liquid crystal displays (LCDs) and light emitting diode displays (LEDs). Display element 112 may comprise, for example, a computer display screen, touchscreen display, video monitor, television-like device, and/or a television. Display element 112 may be digital and/or analog. Under the control of the OS 1080 (or one or more software applications), platform 1010 may display processed images on display element 112. The images may be provided by 3D reconstruction system 108, depth camera 106, or other sources. Camera 106 may be configured to provide color (RGB) and depth images or scans of the handheld object from which a 3D reconstruction of the object may be generated.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

3D reconstruction system 108 is configured to generate a 3D reconstruction of a handheld rigid object. The reconstruction is based on a scanning of the object by a static depth camera, as the user rotates the object to present various views to the system. 3D reconstruction system 108 may include any or all of the components illustrated in FIG. 3 and described above. 3D reconstruction system 108 can be implemented or otherwise used in conjunction with a variety of suitable software and/or hardware that is coupled to or that otherwise forms a part of system 1000. 3D reconstruction system 108 can additionally or alternatively be implemented or otherwise used in conjunction with user I/O devices that are capable of providing information to, and receiving information and commands from, a user. These I/O devices may include display element 112, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments 3D reconstruction system 108 may be installed local to system 1000, as shown in the example embodiment of FIG. 10. Alternatively, system 1000 can be implemented in a client-server arrangement (or local and cloud based arrangement) wherein at least some functionality associated with 3D reconstruction system 108 is provided to system 1000 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for generating 3D object image variations, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, 3D reconstruction system 108 may operate by leveraging processing resources provided by a remote computer system accessible via network 1094. In other embodiments the functionalities disclosed herein can be incorporated into other software applications, such as image management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system onchip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for generating a 3-Dimensional (3D) reconstruction of an object. The method comprises receiving a plurality of 3D image frames of a handheld object from a static depth camera, each frame comprising a color image frame comprising color pixels and a depth map frame comprising depth pixels, wherein each of the 3D image frames is associated with an updated pose of the object. The method also comprises extracting a segment of each 3D image frame corresponding to the object and a hand in which the object is being held. The method further comprises isolating the hand from each extracted segment. The method further comprises filtering each 3D image frame by removing regions of the frame outside of the extracted segment and removing regions of the frame corresponding to the isolated hand. The method further comprises calculating the updated object pose in each filtered 3D image frame. The method further comprises calculating a 3D position for each depth pixel from the depth map frame of each filtered 3D image frame, the calculated position based on the updated object pose associated with that filtered 3D image frame.

Example 2 includes the subject matter of Example 1, further comprising rectifying the color image frame and the depth map frame to compensate for offset between sensors of the depth camera.

Example 3 includes the subject matter of Examples 1 and 2, wherein the extracting further comprises determining the segment of each 3D image frame corresponding to the object and the hand based on distance to the camera and based on a connected components analysis.

Example 4 includes the subject matter of Examples 1-3, wherein the isolating further comprises: over-segmenting the extracted segment into sub-regions; initializing a hand region seed comprising one or more sub-regions of a first of the image frames that border the image frame; classifying sub-regions as being associated with the hand based on a comparison of color pixels and depth pixels of the sub-region to color pixels and depth pixels of the hand region seed; and updating the hand region seed based on the classification.

Example 5 includes the subject matter of Examples 1-4, wherein over-segmenting further comprises performing k-means clustering on the extracted segment.

Example 6 includes the subject matter of Examples 1-5, wherein calculating the updated object pose further comprises estimating a rigid transformation of the object based on an Iterative Closest Point (ICP) matching operation performed on the depth pixels or an RGB feature matching operation performed on the color pixels.

Example 7 includes the subject matter of Examples 1-6, further comprising accumulating the calculated 3D positions of each depth pixel into a global coordinate system based volumetric representation of the object.

Example 8 includes the subject matter of Examples 1-7, further comprising providing feedback to a user holding the object, the feedback to guide the future movement of the object, the feedback comprising a raycast rendering of the volumetric representation of the object at a given point in time.

Example 9 is a system for generating a 3-Dimensional (3D) reconstruction of an object. The system comprises a static depth camera to provide a plurality of 3D image frames of a handheld object, each frame comprising a color image frame comprising color pixels and a depth map frame comprising depth pixels, wherein each of the 3D image frames is associated with an updated pose of the object. The system also comprises a hand and object segment extraction circuit to extract a segment of each 3D image frame corresponding to the object and a hand in which the object is being held. The system further comprises a hand isolation circuit to isolate the hand from each extracted segment. The system further comprises a object filter circuit to filter each 3D image frame by removing regions of the frame outside of the extracted segment and removing regions of the frame corresponding to the isolated hand. The system further comprises an object pose update calculation circuit to calculate the updated object pose in each filtered 3D image frame. The system further comprises an object depth pixel accumulation circuit to calculate a 3D position for each depth pixel from the depth map frame of each filtered 3D image frame, the calculated position based on the updated object pose associated with that filtered 3D image frame.

Example 10 includes the subject matter of Example 9, further comprising a rectification circuit to rectify the color image frame and the depth map frame to compensate for offset between sensors of the depth camera.

Example 11 includes the subject matter of Examples 9 and 10, wherein the hand and object segment extraction circuit is further to determine the segment of each 3D image frame corresponding to the object and the hand based on distance to the camera and based on a connected components analysis.

Example 12 includes the subject matter of Examples 9-11, wherein the hand isolation circuit is further to: over-segment the extracted segment into sub-regions; initialize a hand region seed comprising one or more sub-regions of a first of the image frames that border the image frame; classify sub-regions as being associated with the hand based on a comparison of color pixels and depth pixels of the sub-region to color pixels and depth pixels of the hand region seed; and update the hand region seed based on the classification.

Example 13 includes the subject matter of Examples 9-12, wherein over-segmenting further comprises performing k-means clustering on the extracted segment.

Example 14 includes the subject matter of Examples 9-13, wherein the object pose update calculation circuit is further to estimate a rigid transformation of the object based on an Iterative Closest Point (ICP) matching operation performed on the depth pixels or an RGB feature matching operation performed on the color pixels.

Example 15 includes the subject matter of Examples 9-14, wherein the object depth pixel accumulation circuit is further to accumulate the calculated 3D positions of each depth pixel into a global coordinate system based volumetric representation of the object.

Example 16 includes the subject matter of Examples 9-15, further comprising a user feedback circuit to provide feedback to a user holding the object, the feedback to guide the future movement of the object, the feedback comprising a raycast rendering of the volumetric representation of the object at a given point in time.

Example 17 is at least one non-transitory computer readable storage medium having instructions encoded thereon that, when executed by one or more processors, result in the following operations for generating a 3-Dimensional (3D) reconstruction of an object. The operations comprise receiving a plurality of 3D image frames of the object from a static depth camera, each frame comprising a color image frame comprising color pixels and a depth map frame comprising depth pixels, wherein each of the 3D image frames is associated with an updated pose of the object. The operations also comprise extracting a segment of each 3D image frame corresponding to the object and a hand in which the object is being held. The operations further comprise isolating the hand from each extracted segment. The operations further comprise filtering each 3D image frame by removing regions of the frame outside of the extracted segment and removing regions of the frame corresponding to the isolated hand. The operations further comprise calculating the updated object pose in each filtered 3D image frame. The operations further comprise calculating a 3D position for each depth pixel from the depth map frame of each filtered 3D image frame, the calculated position based on the updated object pose associated with that filtered 3D image frame.

Example 18 includes the subject matter of Example 17, further comprising rectifying the color image frame and the depth map frame to compensate for offset between sensors of the depth camera.

Example 19 includes the subject matter of Examples 17 and 18, wherein the extracting further comprises determining the segment of each 3D image frame corresponding to the object and the hand based on distance to the camera and based on a connected components analysis.

Example 20 includes the subject matter of Examples 17-19, wherein the isolating further comprises: over-segmenting the extracted segment into sub-regions; initializing a hand region seed comprising one or more sub-regions of a first of the image frames that border the image frame; classifying sub-regions as being associated with the hand based on a comparison of color pixels and depth pixels of the sub-region to color pixels and depth pixels of the hand region seed; and updating the hand region seed based on the classification.

Example 21 includes the subject matter of Examples 17-20, wherein over-segmenting further comprises performing k-means clustering on the extracted segment.

Example 22 includes the subject matter of Examples 17-21, wherein calculating the updated object pose further comprises estimating a rigid transformation of the object based on an Iterative Closest Point (ICP) matching operation performed on the depth pixels or an RGB feature matching operation performed on the color pixels.

Example 23 includes the subject matter of Examples 17-22, further comprising accumulating the calculated 3D positions of each depth pixel into a global coordinate system based volumetric representation of the object.

Example 24 includes the subject matter of Examples 17-23, further comprising providing feedback to a user holding the object, the feedback to guide the future movement of the object, the feedback comprising a raycast rendering of the volumetric representation of the object at a given point in time.

Example 25 is a system for generating a 3-Dimensional (3D) reconstruction of an object. The system comprises means for receiving a plurality of 3D image frames of the object from a static depth camera, each frame comprising a color image frame comprising color pixels and a depth map frame comprising depth pixels, wherein each of the 3D image frames is associated with an updated pose of the object. The system also comprises means for extracting a segment of each 3D image frame corresponding to the object and a hand in which the object is being held. The system further comprises means for isolating the hand from each extracted segment. The system further comprises means for filtering each 3D image frame by removing regions of the frame outside of the extracted segment and removing regions of the frame corresponding to the isolated hand. The system further comprises means for calculating the updated object pose in each filtered 3D image frame. The system further comprises means for calculating a 3D position for each depth pixel from the depth map frame of each filtered 3D image frame, the calculated position based on the updated object pose associated with that filtered 3D image frame.

Example 26 includes the subject matter of Example 25, further comprising means for rectifying the color image frame and the depth map frame to compensate for offset between sensors of the depth camera.

Example 27 includes the subject matter of Examples 25 and 26, wherein the extracting further comprises means for determining the segment of each 3D image frame corresponding to the object and the hand based on distance to the camera and based on a connected components analysis.

Example 28 includes the subject matter of Examples 25-27, wherein the isolating further comprises: means for over-segmenting the extracted segment into sub-regions; means for initializing a hand region seed comprising one or more sub-regions of a first of the image frames that border the image frame; means for classifying sub-regions as being associated with the hand based on a comparison of color pixels and depth pixels of the sub-region to color pixels and depth pixels of the hand region seed; and means for updating the hand region seed based on the classification.

Example 29 includes the subject matter of Examples 25-28, wherein over-segmenting further comprises means for performing k-means clustering on the extracted segment.

Example 30 includes the subject matter of Examples 25-29, wherein calculating the updated object pose further comprises means for estimating a rigid transformation of the object based on an Iterative Closest Point (ICP) matching operation performed on the depth pixels or an RGB feature matching operation performed on the color pixels.

Example 31 includes the subject matter of Examples 25-30, further comprising means for accumulating the calculated 3D positions of each depth pixel into a global coordinate system based volumetric representation of the object.

Example 32 includes the subject matter of Examples 25-31, further comprising means for providing feedback to a user holding the object, the feedback to guide the future movement of the object, the feedback comprising a raycast rendering of the volumetric representation of the object at a given point in time.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for generating a 3-Dimensional (3D) reconstruction of an object, the method comprising:
   receiving, by a processor, a plurality of 3D image frames of a handheld object from a static depth camera, each frame comprising a color image frame comprising color pixels and a depth map frame comprising depth pixels, wherein each of the 3D image frames is associated with an updated pose of the object;
   extracting, by the processor, a segment of each 3D image frame corresponding to the object and a hand in which the object is being held;
   isolating, by the processor, the hand from each extracted segment;
   filtering, by the processor, each 3D image frame by removing regions of the frame outside of the extracted segment and removing regions of the frame corresponding to the isolated hand;
   calculating, by the processor, the updated object pose in each filtered 3D image frame; and
   calculating, by the processor, a 3D position for each depth pixel from the depth map frame of each filtered 3D image frame, the calculated position based on the updated object pose associated with that filtered 3D image frame.

2. The method of claim 1, further comprising rectifying the color image frame and the depth map frame to compensate for offset between sensors of the depth camera.

3. The method of claim 1, wherein the extracting further comprises determining the segment of each 3D image frame corresponding to the object and the hand based on distance to the camera and based on a connected components analysis.

4. The method of claim 1, wherein the isolating further comprises:
   over-segmenting the extracted segment into sub-regions;
   initializing a hand region seed comprising one or more sub-regions of a first of the image frames that border the image frame;
   classifying sub-regions as being associated with the hand based on a comparison of color pixels and depth pixels of the sub-region to color pixels and depth pixels of the hand region seed; and
   updating the hand region seed based on the classification.

5. The method of claim 4, wherein over-segmenting further comprises performing k-means clustering on the extracted segment.

6. The method of claim 1, wherein calculating the updated object pose further comprises estimating a rigid transformation of the object based on an Iterative Closest Point (ICP) matching operation performed on the depth pixels or an RGB feature matching operation performed on the color pixels.

7. The method of claim 1, further comprising accumulating the calculated 3D positions of each depth pixel into a global coordinate system based volumetric representation of the object.

8. The method of claim 7, further comprising providing feedback to a user holding the object, the feedback to guide the future movement of the object, the feedback comprising a raycast rendering of the volumetric representation of the object at a given point in time.

9. A system for generating a 3-Dimensional (3D) reconstruction of an object, the system comprising:
   a static depth camera to provide a plurality of 3D image frames of a handheld object, each frame comprising a color image frame comprising color pixels and a depth map frame comprising depth pixels, wherein each of the 3D image frames is associated with an updated pose of the object;
   a hand and object segment extraction circuit to extract a segment of each 3D image frame corresponding to the object and a hand in which the object is being held;
   a hand isolation circuit to isolate the hand from each extracted segment;
   a object filter circuit to filter each 3D image frame by removing regions of the frame outside of the extracted segment and removing regions of the frame corresponding to the isolated hand;
   an object pose update calculation circuit to calculate the updated object pose in each filtered 3D image frame; and
   an object depth pixel accumulation circuit to calculate a 3D position for each depth pixel from the depth map frame of each filtered 3D image frame, the calculated position based on the updated object pose associated with that filtered 3D image frame.

10. The system of claim 9, further comprising a rectification circuit to rectify the color image frame and the depth map frame to compensate for offset between sensors of the depth camera.

11. The system of claim 9, wherein the hand and object segment extraction circuit is further to determine the segment of each 3D image frame corresponding to the object and the hand based on distance to the camera and based on a connected components analysis.

12. The system of claim 9, wherein the hand isolation circuit is further to:
   over-segment the extracted segment into sub-regions;
   initialize a hand region seed comprising one or more sub-regions of a first of the image frames that border the image frame;
   classify sub-regions as being associated with the hand based on a comparison of color pixels and depth pixels of the sub-region to color pixels and depth pixels of the hand region seed; and
   update the hand region seed based on the classification.

13. The system of claim 12, wherein over-segmenting further comprises performing k-means clustering on the extracted segment.

14. The system of claim 9, wherein the object pose update calculation circuit is further to estimate a rigid transformation of the object based on an Iterative Closest Point (ICP) matching operation performed on the depth pixels or an RGB feature matching operation performed on the color pixels.

15. The system of claim 9, wherein the object depth pixel accumulation circuit is further to accumulate the calculated 3D positions of each depth pixel into a global coordinate system based volumetric representation of the object.

16. The system of claim 15, further comprising a user feedback circuit to provide feedback to a user holding the object, the feedback to guide the future movement of the object, the feedback comprising a raycast rendering of the volumetric representation of the object at a given point in time.

17. At least one non-transitory computer readable storage medium having instructions encoded thereon that, when executed by one or more processors, result in the following operations for generating a 3-Dimensional (3D) reconstruction of an object, the operations comprising:
   receiving a plurality of 3D image frames of the object from a static depth camera, each frame comprising a color image frame comprising color pixels and a depth map frame comprising depth pixels, wherein each of the 3D image frames is associated with an updated pose of the object;
   extracting a segment of each 3D image frame corresponding to the object and a hand in which the object is being held;
   isolating the hand from each extracted segment;
   filtering each 3D image frame by removing regions of the frame outside of the extracted segment and removing regions of the frame corresponding to the isolated hand;
   calculating the updated object pose in each filtered 3D image frame; and
   calculating a 3D position for each depth pixel from the depth map frame of each filtered 3D image frame, the calculated position based on the updated object pose associated with that filtered 3D image frame.

18. The computer readable storage medium of claim 17, further comprising rectifying the color image frame and the depth map frame to compensate for offset between sensors of the depth camera.

19. The computer readable storage medium of claim 17, wherein the extracting further comprises determining the segment of each 3D image frame corresponding to the object and the hand based on distance to the camera and based on a connected components analysis.

20. The computer readable storage medium of claim 17, wherein the isolating further comprises:
   over-segmenting the extracted segment into sub-regions;
   initializing a hand region seed comprising one or more sub-regions of a first of the image frames that border the image frame;
   classifying sub-regions as being associated with the hand based on a comparison of color pixels and depth pixels of the sub-region to color pixels and depth pixels of the hand region seed; and
   updating the hand region seed based on the classification.

21. The computer readable storage medium of claim 20, wherein over-segmenting further comprises performing k-means clustering on the extracted segment.

22. The computer readable storage medium of claim 17, wherein calculating the updated object pose further comprises estimating a rigid transformation of the object based on an Iterative Closest Point (ICP) matching operation performed on the depth pixels or an RGB feature matching operation performed on the color pixels.

23. The computer readable storage medium of claim 17, further comprising accumulating the calculated 3D positions of each depth pixel into a global coordinate system based volumetric representation of the object.

24. The computer readable storage medium of claim 23, further comprising providing feedback to a user holding the object, the feedback to guide the future movement of the object, the feedback comprising a raycast rendering of the volumetric representation of the object at a given point in time.

* * * * *

UNITED STATES PATENT AND TRADEMARK OFFICE
CERTIFICATE OF CORRECTION

| | | |
|---|---|---|
| PATENT NO. | : 9,639,943 B1 | Page 1 of 1 |
| APPLICATION NO. | : 14/976021 | |
| DATED | : May 2, 2017 | |
| INVENTOR(S) | : Gershom Kutliroff and Maoz Madmony | |

It is certified that error appears in the above-identified patent and that said Letters Patent is hereby corrected as shown below:

On the Title Page (*) Notice: please remove sentence - "This patent is subject to a terminal disclaimer."

Item (45) Date of Patent: please remove "*"

Signed and Sealed this
Eighteenth Day of February, 2020

Andrei Iancu
*Director of the United States Patent and Trademark Office*